United States Patent
Jeong et al.

(10) Patent No.: US 8,475,697 B2
(45) Date of Patent: Jul. 2, 2013

(54) METHOD TO MANUFACTURE REINFORCEMENT INSERTION TYPE MASCARA BRUSH AND MANUFACTURING FOR TRANSFER MOLD

(75) Inventors: Haewon Jeong, Nanan-Gu (KR); Hakchan Kim, Gunpo (KR); Jooho Kim, Gunpo (KR); Changgyu Yoo, Suwon (KR); Jiyoung Park, Sungnam (KR)

(73) Assignee: AMOREPACIFIC Corporation, Seoul (KR)

(*) Notice: Subject to any disclaimer, the term of this patent is extended or adjusted under 35 U.S.C. 154(b) by 127 days.

(21) Appl. No.: 12/600,035

(22) PCT Filed: Jun. 13, 2007

(86) PCT No.: PCT/KR2007/002838
§ 371 (c)(1),
(2), (4) Date: Nov. 13, 2009

(87) PCT Pub. No.: WO2008/146968
PCT Pub. Date: Dec. 4, 2008

(65) Prior Publication Data
US 2010/0258972 A1  Oct. 14, 2010

(30) Foreign Application Priority Data
May 28, 2007  (KR) .................. 10-2007-0051702

(51) Int. Cl.
*A46B 11/04* (2006.01)
(52) U.S. Cl.
USPC .................. 264/279; 264/271.1; 425/542

(58) Field of Classification Search
USPC .................. 264/279, 271.1, 259; 425/542
See application file for complete search history.

(56) References Cited

U.S. PATENT DOCUMENTS

| | | | | |
|---|---|---|---|---|
| 2,285,149 A | * | 6/1942 | Arcey | 62/73 |
| 4,434,518 A | * | 3/1984 | Watanabe | 12/142 RS |
| 4,505,661 A | * | 3/1985 | Bielfeldt | 425/190 |
| 5,738,895 A | * | 4/1998 | Fuchs et al. | 426/515 |
| 6,616,366 B1 | * | 9/2003 | Weihrauch | 401/286 |
| 6,623,200 B1 | * | 9/2003 | Gueret | 401/129 |

FOREIGN PATENT DOCUMENTS

| | | |
|---|---|---|
| EP | 75051 A1 | 3/1983 |
| JP | 2007-7188 A | 1/2007 |
| KR | 20-0396785 Y1 | 9/2005 |

OTHER PUBLICATIONS

International Search Report of PCT/KR2007/002838.

* cited by examiner

*Primary Examiner* — Galen Hauth
(74) *Attorney, Agent, or Firm* — Maxon IP LLC.; Justin H. Kim (57) ABSTRACT

A transfer molding box and a method to produce a plurality of brushes with an applicator is provided. The transfer molding box includes a pressing plate 30, an upper molding box 10 where at least a brush molding groove is formed and a lower molding box 20 where at least another brush molding groove corresponding to the brush molding groove of the upper molding box is formed and placed under the upper molding box 10. A wick 1 is settled in horizontal direction between the brush molding groove of the upper molding box and the brush molding groove of the lower molding box. Further material inserting portion 11 and a projected pressing portion 31 which has corresponding shape to the material inserting portion 11 are provided at the top of the upper molding box 10 and at the top of the lower molding box 20, respectively.

7 Claims, 6 Drawing Sheets

METHOD TO MANUFACTURE REINFORCEMENT INSERTION TYPE MASCARA BRUSH AND MANUFACTURING FOR TRANSFER MOLD

TECHNICAL FIELD

The present invention relates to a method for producing a mascara brush for eyelash makeup, more particularly, to a method for producing a large amount of brushes with applicator and a transfer molding box therefor.

BACKGROUND ART

Mascara, a kind of makeup instruments, is used to makeup eyelash to look longer and thicker than it is. Mascara makes eyelash, which stretches itself out upward or downward, waved so that it looks beautiful.

The method to makeup eyelash with the mascara is described in brief.

To makeup upper eyelash, the brush with an appropriate amount of mascara solution brushes upper eyelash downward from the root of the upper eyelash with a soft touch and then brushes the upper eyelash upward with a stroke while eyes are kept being turned down. A batter makeup can be achieved when the brush is stroked up in zigzag.

To makeup lower eyelash, the brush brushes the lower eyelash from side to side and then the brush brushes the lower eyelash along its grain softly.

Fine makeup can be achieved when the lower eyelash is brushed finely one by one.

To achieve a fine and clear makeup, one should wait until mascara solution is dried up because mascara solution can be applied to other parts when he/she moves eyes impatiently.

Such a brush to makeup eyelash can be divided into two types, one is made in the manner that two strings of steel, where nylon is provided between them, is twisted as many turns as desired in the form of a screw; and the other, so called a rubber brush, is made in the manner that a thread and a trough are formed in series on the surface of a rubber having a wick.

Because the brush with the nylon is limited in many ways such as the number of brush strings per each twist, its shape, a processing method, etc, there are many problems in developing a novel and advanced brush.

In the meantime, because the rubber brush has an applicator in which circular blades or disks of soft rubber or elastic silicon are formed in series, a high degree of accuracy and an amount of technical difficulty exist in making a corresponding molding box.

Further, because a special kind of the machine is needed to mold the rubber brush there is a factor to increase cost.

DISCLOSURE OF INVENTION

Technical Problem

The present invention is designed to solve those problems.
An object of the present invention is to provide a method for producing a large amount of brushes with an applicator.

Another object of the present invention is to provide a molding box for producing a large amount of brushes with an applicator.

Technical Solution

According to the present invention, a method to produce a brush with an applicator, where at least a thread and a trough are formed on the surface of rubber or silicon which are fixed to a wick includes the steps of;

cutting step for cutting the wick;

arranging step for arranging the wick between an upper molding box and a lower molding box;

inserting step for inserting molding material into the upper portion of the upper molding box;

transfer-molding step for pressing a pressing plate so that the molding material is injected into a brush molding groove between the upper molding box and the lower molding box;

separating step for separating the pressing plate and the upper molding box from the lower molding box; and extracting step for extracting the brush, where the applicator is formed on the circumference of the end portion of the wick, from the lower molding box.

According to the present invention, a transfer molding box to produce a brush with an applicator, where at least a thread and a through are formed on the surface of rubber or silicon which are fixed to a wick includes a pressing plate;

a upper molding box where at least a brush molding groove, which has the shape corresponding to the shape of the half of the applicator, is formed and placed under the pressing plate; and a lower molding box where at least another brush molding groove, which has the shape corresponding to the brush molding groove of the upper molding box and on which the wick is settled in the horizontal direction, is formed and placed under the upper molding box;

in which a material inserting portion and a projected pressing portion which has corresponding shape to the material inserting portion are provided at the top of the upper molding box and at the top of the lower molding box, respectively;

a material gate is formed at the material inserting portion to perforate to the brush molding groove of the upper molding box.

Advantageous Effects

According to the present invention, because a large amount of brushes can be produced through a transfer molding box so that increase of earnings through decrease of cost can be achieved.

Further, according to the present invention, because brushes with a good quality can be produced in a large amount at once by a single molding box, stability of quality can be kept easily, Still further, according to the present invention, because the variation of the shape of the brush and the variation of the material with softness and elasticity of the brush can be done easily, various need of customer can be met.

BRIEF DESCRIPTION OF THE DRAWINGS

The above and other features and advantages of the present invention will become more apparent by describing in detail preferred embodiments thereof with reference to the attached drawings in which.

BRIEF DESCRIPTION OF NUMERALS IN DRAWINGS

1 . . . wick 2, 2 . . . brush molding groove
3 . . . material gate 4 . . . applicator
5 . . . guide pin 6 . . . guide bussing
10 . . . upper molding box 11 . . . material injection portion
20 . . . lower molding box 21 . . . block groove
22 . . . extracting block 23 . . . wick settling groove
30 . . . ressing plate 31 . . . projected pressing portion

MODE FOR THE INVENTION

Reference will now be made in detail to the embodiments of the present invention, examples of which are illustrated in the accompanying drawings, wherein like reference numerals refer to the like elements throughout. The embodiments are described below to explain the present invention by referring to the figures. For the sake of clearness and concision, technology related to the present invention that is not novel and is well known in the art to which present invention pertains will not be described herein.

Figure 1:
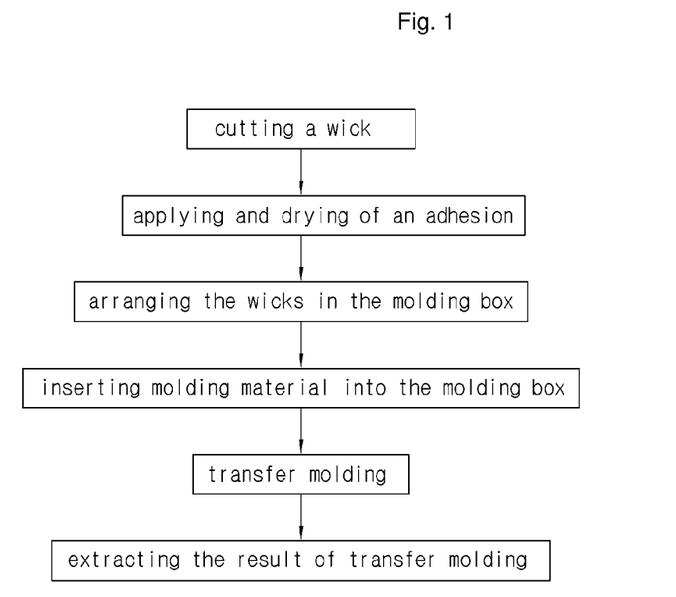
FIG. 1 shows a block diagram illustrating the method for producing a brush with an applicator according to the present invention step by step.

FIG. 1 shows a block diagram illustrating the method for producing a brush with an applicator according to the present invention step by step. The method according to the present invention can produce a large amount of brushes by a single molding box.

The method according to the present invention includes the steps of;

cutting step for cutting the wick;

applying and drying step for applying an adhesion to the cut wick and drying;

arranging step for arranging the wick between an upper molding box and a lower molding box;

inserting step for inserting molding material into the upper portion of the upper molding box;

transfer-molding step for pressing a pressing plate so that the molding material is injected into a brush molding groove between the upper molding box and the lower molding box;

separating step for separating the pressing plate and the upper molding box from the lower molding box; and extracting step for extracting the brush, where the applicator is formed on the circumference of the end portion of the wick, from the lower molding box.

Figure 2:
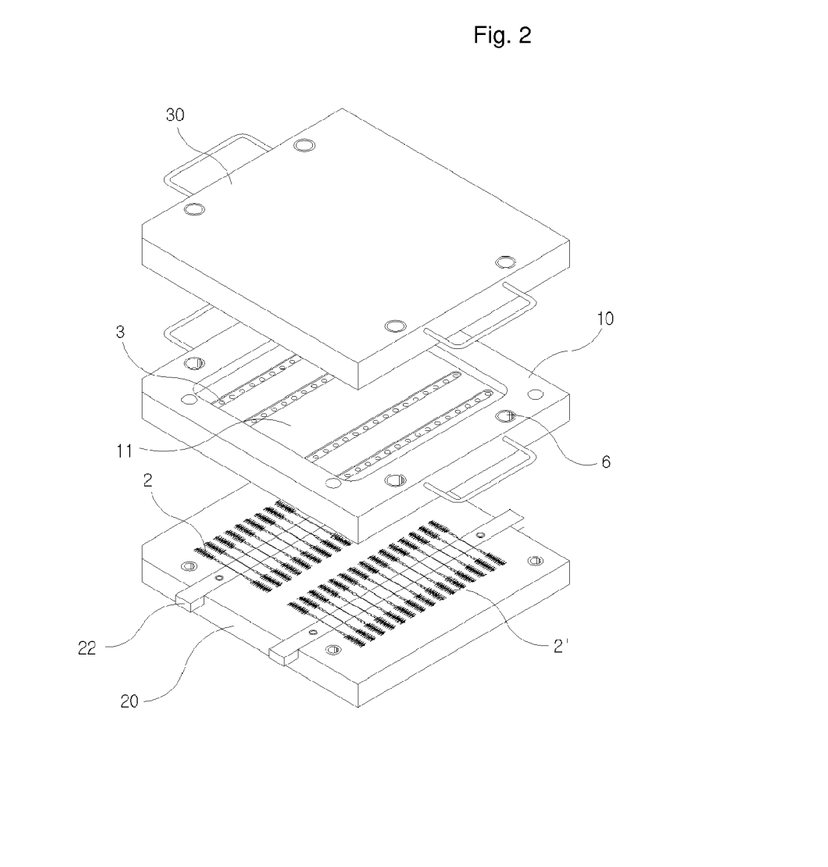
FIG. 2 shows a separated perspective view of the molding box for producing a brush with an applicator according to the present invention.
Figure 3:
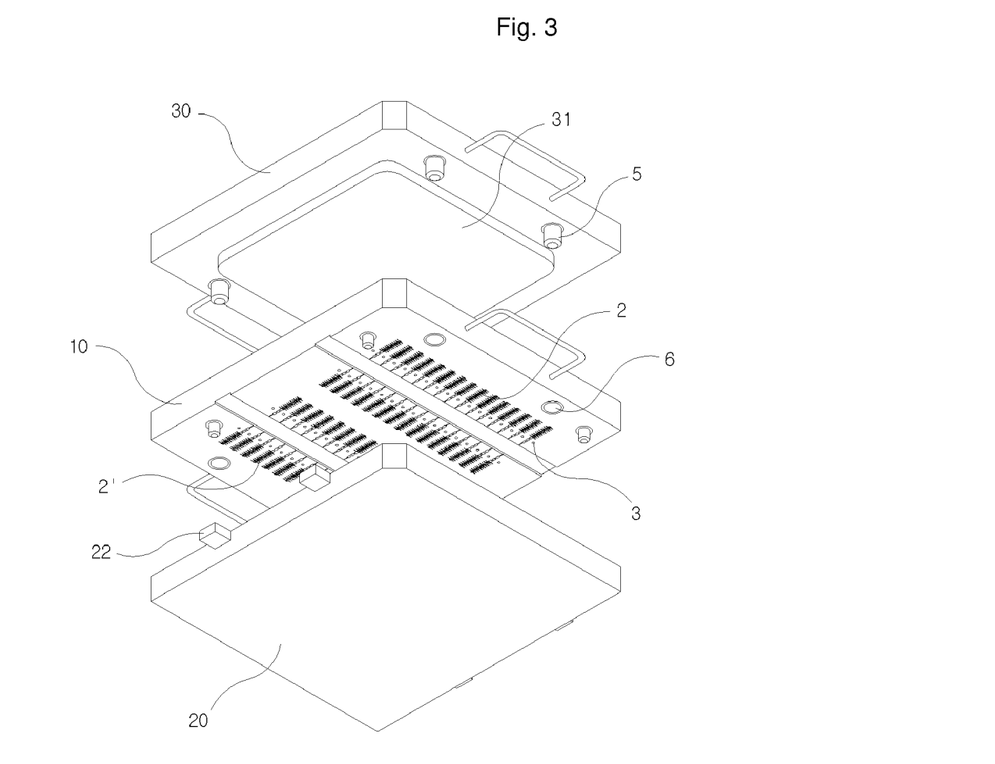
FIG. 3 shows a bottom separated perspective view of the molding box according to the present invention.
Figure 4:
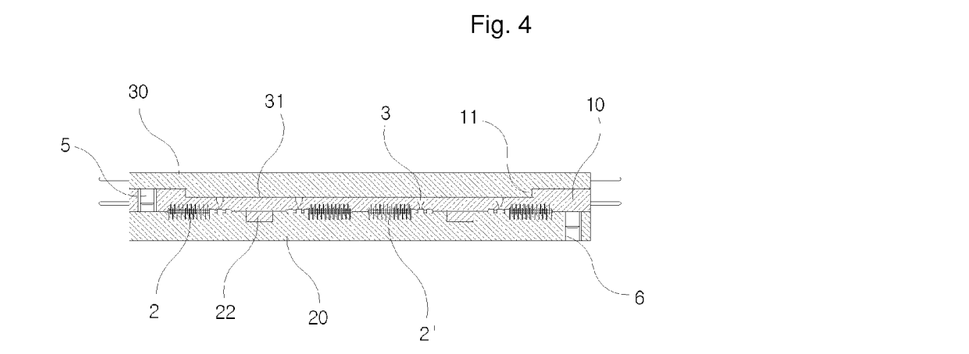
FIG. 4 shows a sectional view of the molding box according to the present invention illustrating the state when the upper molding box and the lower molding box are joined.
Figure 5:
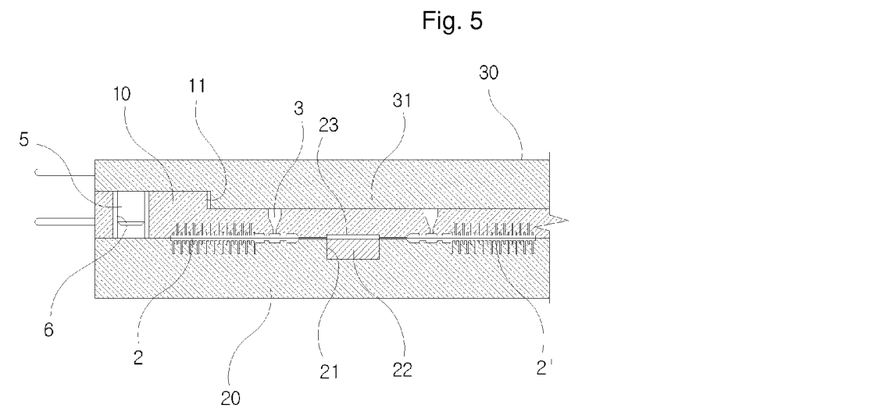
FIG. 5 shows an enlarged sectional view of the molding box according to the present invention.

FIG. 2 shows a separated perspective view of the molding box for producing a brush with an applicator according to the present invention, FIG. 3 shows a bottom separated perspective view of the molding box according to the present invention, FIG. 4 shows a sectional view of the molding box according to the present invention illustrating the state when the upper molding box and the lower molding box are joined and FIG. 5 shows an enlarged sectional view of the molding box according to the present invention;

The transfer molding box according to the present invention is largely divided into an upper molding box 10, a lower molding box 20 and a pressing plate 30 which is located on the upper molding box 10.

The upper molding box 10, a lower molding box 20 and a pressing plate 30 are piled up. At the bottom of the upper molding box 10 and at the top of the lower molding box, brush molding grooves 2 and 2 are arranged in series.

Each of the brush molding grooves 2 and 2 of the upper molding box 10 and the lower molding box 20 are formed to face each other and each of them is formed to have a shape corresponding to the half of the applicator.

The wicks 1 of ceramic-like or resin-like are settled between the brush molding grooves 2 and 2 of the upper molding box 10 and the lower molding box 20. A material injection portion 11 and a projected pressing portion 31 are provided at the bottom of the upper molding box 10 and at the top of the pressing plate 31, respectively.

Material gates 3, which perforates to the brush molding grooves 2 and 2 of the upper molding box 10, is provided in the material injection portion 11. Molding material on the material injection portion 11 is injected in to the brush molding grooves 2 and 2 through the material gates 3 while the pressing plate 30 is pressed.

The brush, which is composed of the wick 1 of metal-like, ceramic-like or resin-like and the applicator 4 formed by the brush molding grooves 2 and 2 is extracted from the lower molding box 20.

A block groove 21 is provided on the top of the lower molding box 20. The location of the block groove 21 corresponds to the middle portion of the wick 1 where the applicator 4 is not formed. An extracting block 22 is provided. The extracting block 22 can be inserted into the block groove 21 or pulled out from the block groove 21 in the vertical direction. A wick settling grooves 23, where the wick 1 is settled in the horizontal direction, are arranged in series on the top of the extracting block 22.

When the applicator 4 is formed at the both ends of the wick 1 by the brush molding grooves 2 and 2 of the upper molding box 10 and the lower molding box 20, the wick 1 and the applicator 4 can be separated at once from the lower molding box 20 by separating the extracting block 22 upward.

A guide pin 5 and a guide bushing 6, which faces each other, are provided at the top of lower molding box 20 and the bottom of the pressing plate 30, respectively. The upper molding box 10 and the pressing plate 20 can be elevated in the vertical direction by the operation of the guide pin 5 and the guide bushing 6.

The transfer molding box according to the present invention will be described in detail by referring the figures accompanied.

As shown in FIG. 2, the transfer molding box according to the present is largely divided into the pressing plate 30 which is located at the top, the upper molding box 10 which is located at the beneath of the pressing plate 30 and the lower molding box 20 which is jointed to the bottom of the upper molding box 10.

The material injection portion 11 which has a concave type groove is provided at the top of the upper molding box 10. The projected pressing portion 31 which has a corresponding shape to the material injection portion 11 is provided at the bottom of the pressing plate 30.

At the bottom of the upper molding box 10 and at the top of the lower molding box 20, the brush molding grooves 2 and 2 are arranged in series. Each of the brush molding grooves 2 and 2 are formed to face each other and each of them is formed to have a shape corresponding to the half of the applicator.

Because the brush molding grooves 2 and 2 are connected to the material injection portion 11 through the material gates 3, molding material in the material injection portion 11 can be injected into the brush molding groove 2 and 2 through the material gates 3.

The extracting block 22 is inserted on the top of the lower molding box 20. The middle portion of the wick 1, which corresponds to the portion where the applicator 4 is not formed, is settled on the top of the extracting block 22. The extracting block can be inserted into the block groove 21 or pulled out from the block groove 21 in the vertical direction.

The wick settling grooves 23, where the wick 1 is settled in the horizontal direction, are arranged in series on the top of the extracting block 22. When a plurality of the wick 1 is arranged and settled in the wick settling grooves 23, both ends of the wick 1 are located between the brush molding grooves 2 and 2 of the upper molding box 10 and the brush molding grooves 2 and 2 of the lower molding box 20.

If the molding material is injected into the brush molding grooves 2 and 2 of the upper molding box 10 when the brush molding grooves 2 and 2 of the upper molding box 10 and the brush molding grooves 2 and 2 of the lower molding box 20 are jointed, the applicator 4 of ceramic-like or resin-like is formed at the both ends of the wick 1.

Each steps of the method which uses the transfer molding box according to the present invention will be described in detail by referring the figures accompanied.

Figure 6:
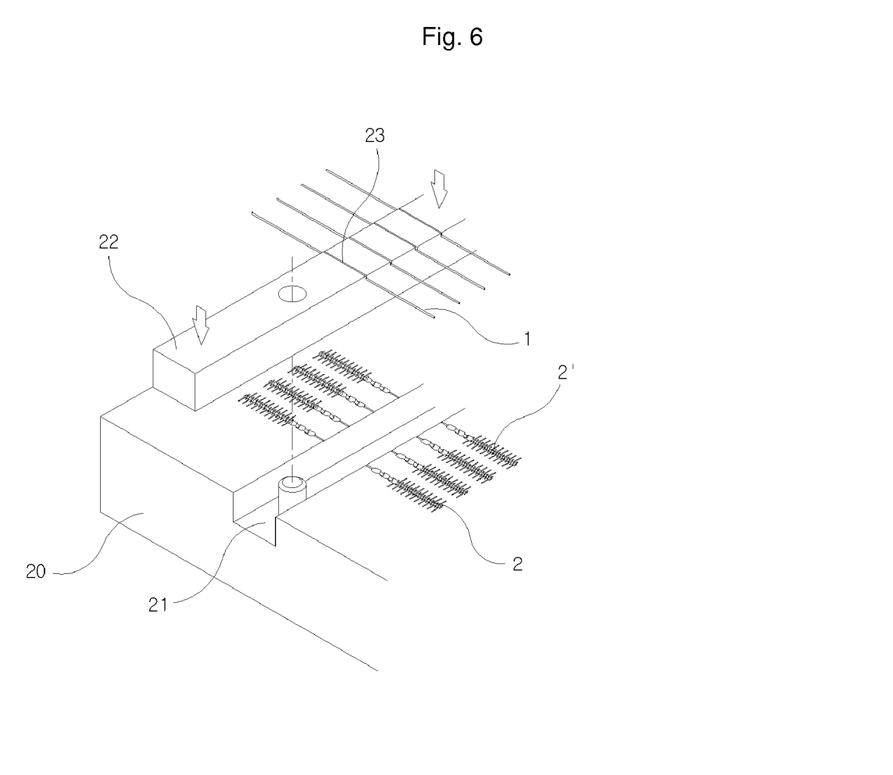
FIG. 6 shows an enlarged sectional view illustrating the state when a wick is inserted in the extracting block of the molding box according to the present invention.

After the wick 1 such as a metal-like, a ceramic-like or a resin-like is cut at the regular length, an adhesion, which is needed to fix the molding material well on the wick 1, is applied on the surface of the wick 1 and dried. A plurality of the wicks 1 are settled in series into the wick settling groove 23 on the extracting block 22 and then, the extracting block 22 is inserted into the block grove 21 of the lower molding box 20, as shown in FIG. 6.

Figure 7:
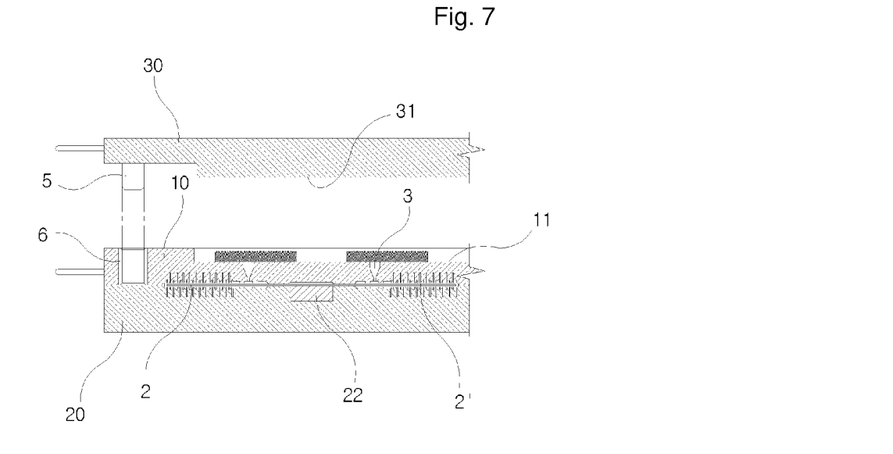
FIG. 7 shows an enlarged sectional view illustrating the state when molding material is inserted into the upper molding box according to the present invention.

After the upper molding box 10 is settled on the lower molding box 20 in the correct direction and location by using the guide pin 5 and the guide bushing 6, a soft molding material, which can be transformed by pressure, is inserted into the material insertion portion 11, which is provided on the top of the upper molding box 10, as shown in FIG. 7.

Figure 8:
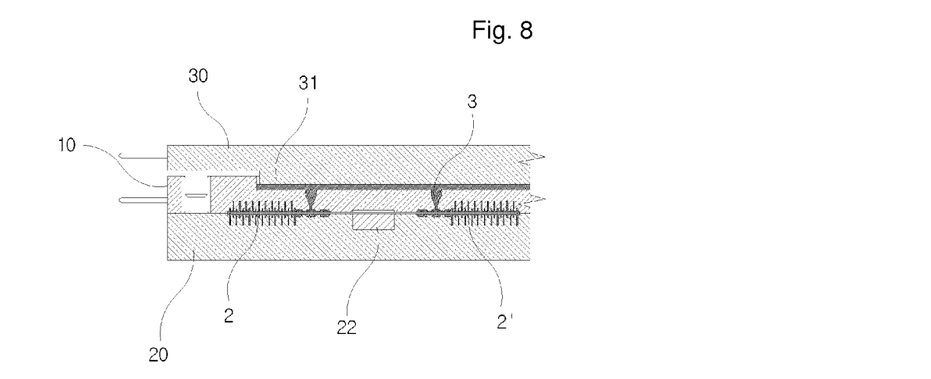
FIG. 8 shows an enlarged sectional view illustrating the state when molding material is injected into the brush molding groove of the molding box according to the present invention.

When the pressing plate 30, which is settled over the upper molding box 10, is pressed downward by a separate pressing machine, as shown in FIG. 8, the projected pressing portion 31 at the bottom of the pressing plate 30 is inserted into the material insertion portion 11, so that the molding material with a characteristic to be transformed easily by pressure is injected into the molding groove 2 and 2 of the upper molding box 10 along the material gate 3.

Figure 9:
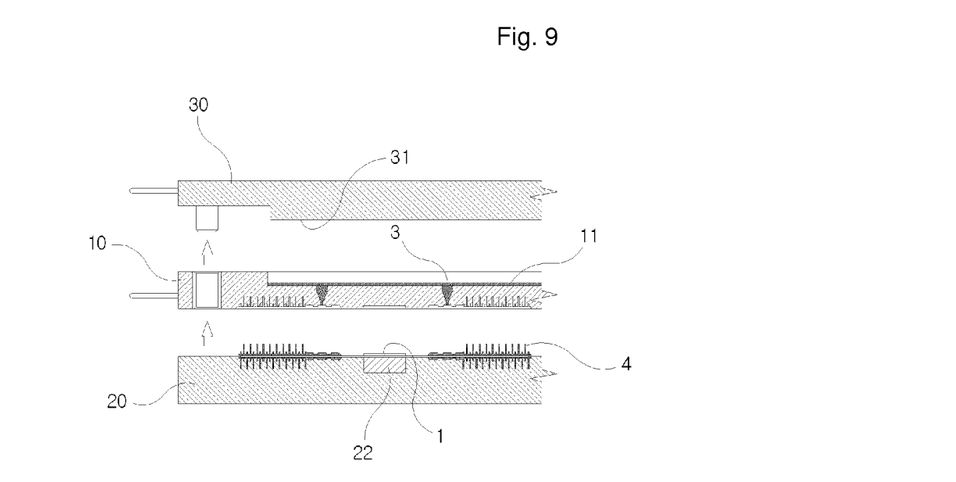
FIG. 9 shows an enlarged sectional view illustrating the state when the pressing plate and the upper molding box are separated from the lower molding box after pressing the pressing plate according to the present invention.

After the pressing operation is completed, the pressing plate 30 and the upper molding box 10 are separated from the lower molding box 20. The applicator 4 is formed at the both ends of the wick 1 by the operation of the brush molding grooves 2 and 2 of the upper molding box 10 and the lower molding box 20. The material gate 3 is disconnected from the molding material in the brush molding groove 2 and 2 naturally during the separating operation of the upper molding box 10 and the lower molding box 20.

Figure 10:
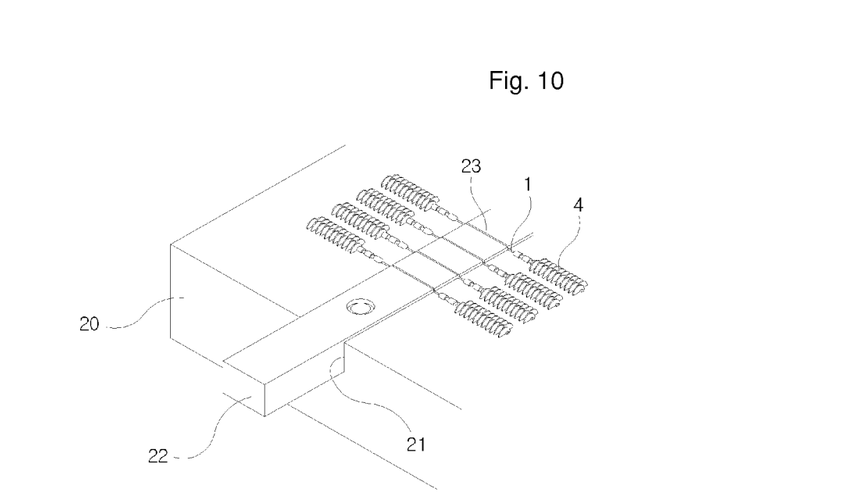
FIG. 10 shows an enlarged perspective view illustrating the state when the upper molding box is seperated, the middle portion of the wick on the extracting block and applicators at the both ends of the wick is half-exposed on the top of the lower molding box.

When the upper molding box 10 is separated, the middle portion of the wick 1 on the extracting block 22 and applicators 4 at the both ends of the wick 1 is half-exposed on the top of the lower molding box 20, as shown in FIG. 10.

Figure 11:
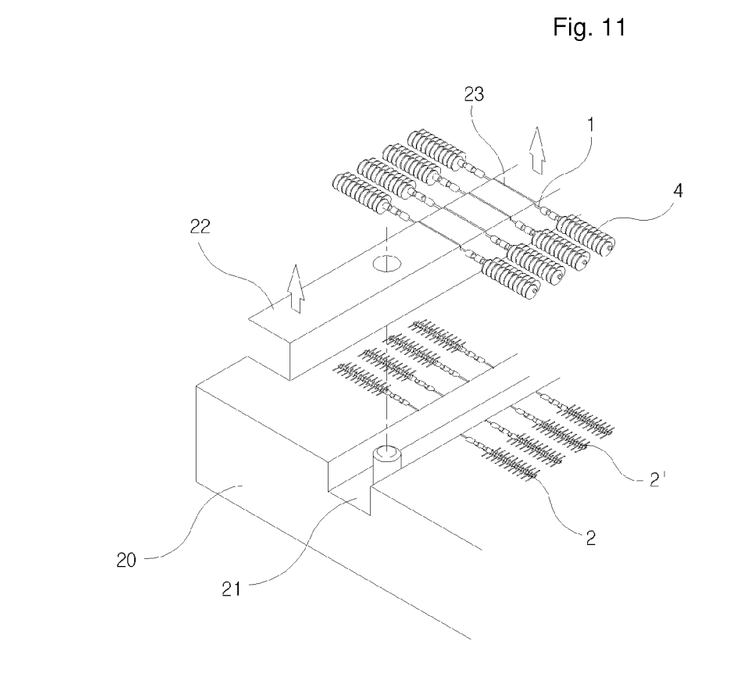
FIG. 11 shows an enlarged perspective view illustrating the state when the brush with an applicator and the extracting block are separated from the lower molding box according to the present invention.

When the extracting block 22 is lifted up, as shown in FIG. 11, the extracting block 22, where the wick 1 and the applicator 4 only are settled, is extracted separately.

Figure 12:
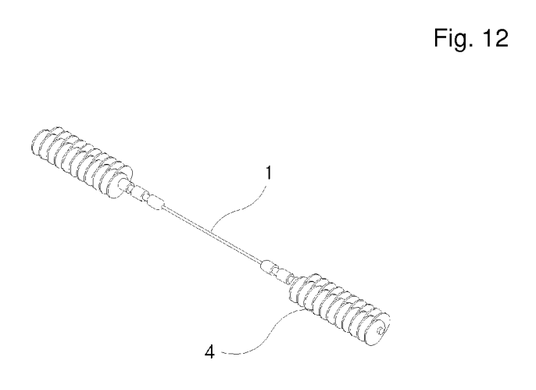
FIG. 12 shows the brush made by the molding box according to the present.

When the wicks 1, which are arranged on the extracting block 22, is pulled out separately, the brush with an applicator 4 of rubber or resin can be achieved.

The shape of the applicator 4 can be varied according to the variation of the transfer molding box and the molding material can be varied to have various colors or various elasticity. Thus method according to the present invention has reasonable and economical merits.

Industrial Applicability

According to the present invention, a large amount of brushes with an applicator, which is used to makeup eyelash, can be produced with a single molding box of a simple structure and a simple producing method so that reduction of cost and mass production of brushes with a good quality can be achieved.

The invention claimed is:

1. A method to produce a plurality of brushes with applicators comprising the steps of;

obtaining a plurality of wicks, each wick having a pair of opposed ends;

obtaining a molding apparatus comprising an upper molding box and a lower molding box, wherein the upper molding box comprises a first plurality of applicator molding half molds arranged in series, and the lower molding box comprises a second plurality of applicator molding half molds arranged in series and the first plurality of applicator molding half molds and the second plurality of applicator molding half molds are matched to form a plurality of aligned applicator molds, each applicator mold having a contour of an applicator, and a horizontal extracting block provided in a block groove in the lower molding box, the horizontal extracting block having defined in an upper surface thereof a plurality of spaced apart horizontal wick grooves, each horizontal wick groove extending between two of the plurality of applicator molds, with the extracting block extending in a direction generally transverse to a direction of the horizontal wick grooves, and the extracting block being configured to move between a lowered position in the block groove and a raised position above the lower molding box;

arranging the plurality of wicks in the molding apparatus in the horizontal wick grooves in the horizontal extracting block between the upper molding box and the lower molding box so that the opposed ends of the wicks are located in the applicator molds;

injecting a molding material into the molding apparatus so that the molding material fills the first plurality of applicator molding half molds and the second plurality of applicator molding half molds, and forms a plurality of applicators affixed to the opposed end portions of the wicks to define brushes with applicators in a horizontal arrangement defined by the wick grooves and the applicator molds;

opening the molding apparatus;

raising the horizontal extracting block to the raised position, simultaneously raising all of the horizontally—arranged brushes above the lower molding box; and removing the plurality of brushes from the wick grooves in the extracting block.

2. The method in claim 1, further comprising:

applying an adhesive to the plurality of wicks and drying the adhesive prior to arranging the plurality of wicks in the wick grooves.

3. The method in claim 1 wherein the wicks are made of metal, ceramic, or resin.

4. The method in claim 1, wherein the molding material is rubber or resin.

5. The method in claim 1, further comprising:

removing the extracting block from the lower molding box when in the raised position prior to removing the plurality of brushes.

6. A method to produce a brush with an applicator, comprising the steps of:

providing a wick with opposed ends;

providing a molding apparatus comprising an upper molding box having a first applicator half mold portion; and a lower molding box having a second applicator half mold portion, positioned such that when the molding apparatus is closed, the first applicator half mold portion and the second applicator half mold portion align to form an applicator mold; and a horizontal extracting block provided in a horizontal block groove in the lower molding box movable between a lowered position in the block groove and a raised position above the lower molding box, the horizontal block groove defining an axis, and the extracting block including a horizontal wick groove positioned generally transverse to the axis;

arranging the wick in the horizontal wick groove with one end thereof positioned to extend into the applicator mold;

closing the molding apparatus with the one end of the wick extending into the applicator mold;

injecting a mold material into the molding apparatus to fill the applicator mold;

curing the mold material in the molding apparatus to define a horizontally—arranged brush with an applicator;

opening the molding apparatus;

raising the horizontal extracting block to the raised position, simultaneously raising the horizontally—arranged brush in the wick groove above the lower molding box; and removing the brush from the extracting block.

7. The method of claim 6, wherein the molding apparatus further comprises a pair of second applicator half molds in the upper and lower molding boxes, respectively, aligning when the molding apparatus is closed to define a second applicator mold, and the horizontal wick groove is positioned so that another end of the wick in the wick groove extends into the second applicator mold; and wherein when the mold material is cured, the horizontally—arranged brush is defined with an applicator at each end of the wick.

\* \* \* \* \*